R. RUPPEL.
EXPANSION JOINT.
APPLICATION FILED MAR. 10, 1915.
1,336,924. Patented Apr. 13, 1920.
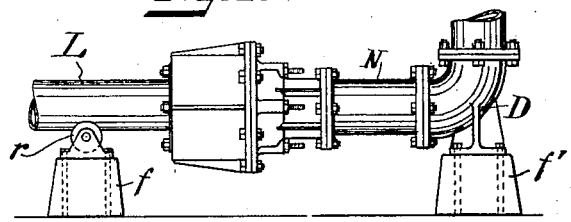
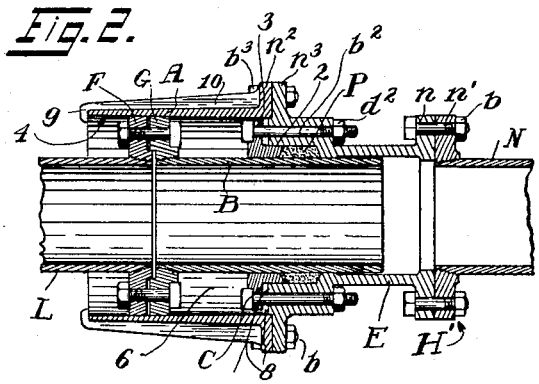
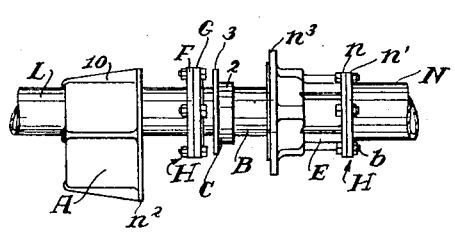
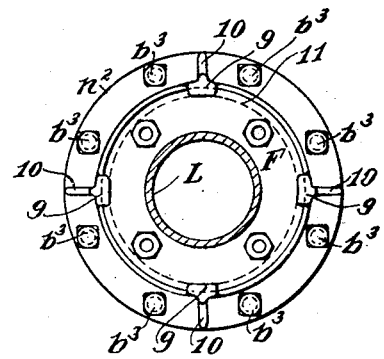
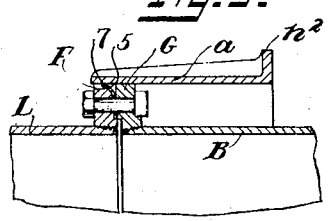
Witnesses:
Charles Horton
H. D. Penney
Inventor:
Richard Ruppel,
By his Atty, F. H. Richards.

UNITED STATES PATENT OFFICE.

RICHARD RUPPEL, OF NEW YORK, N. Y., ASSIGNOR TO SCOTT C. ROSS, OF BUFFALO, NEW YORK.

EXPANSION-JOINT.

1,336,924. Specification of Letters Patent. Patented Apr. 13, 1920.

Continuation of application Serial No. 746,534, filed February 8, 1913. This application filed March 10, 1915. Serial No. 13,479.

*To all whom it may concern:*

Be it known that I, RICHARD RUPPEL, a citizen of the United States, residing in New York, in the county of New York and State of New York, have invented certain new and useful Improvements in Expansion-Joints, of which the following is a specification.

This invention relates to expansion joints for large pipe lines such as used in heating systems.

Since expansion joints of this class, require but little attention for adjustment or the like, and that little, at intervals of months and perhaps years intervening, it is very essential that the same be considerably reliable and that the several working parts be therefore protected from the accidental or unusual, for otherwise, a very simple defect might, before the attendant again examined the joint, have been aggravated sufficiently to cause considerable damage. To this end, it is one of the main objects of the present invention to protect the sliding surfaces of the usual telescoping ends of the pipes so as to prevent the collection or discharge of foreign material onto such surfaces; and it is another object of the invention to protect the usual gland rings of such joints so as to prevent the collection or discharge of foreign material into the path of movement of such gland rings, thereby to assure the proper positioning and operation of such gland rings when being adjusted.

Another object of the invention is to provide an envelop to surround such sliding surfaces, for the protection of the same as above set forth, and to provide an arrangement whereby the gland rings may be adjusted from the outside of such envelop.

And still another object of the invention is to provide such envelop with such a supporting means that the pipe sections when being assembled or disassembled will be assured of a sufficient perch whereby to properly support the pipe section connected to such joint and prevent the same from adopting a position where it might, by its own force, thrust into the working parts of the joint and impair or possibly destroy the same.

This application is a continuation of application, Serial No. 746,534, filed February 8, 1913, as to the subject matter common to the two applications.

These and other features, capabilities and advantages of the invention will appear from the subjoined detailed description of one specific embodiment thereof.

In the accompanying drawing forming a part of this specification, Figure 1 is a side elevation of my improved expansion joint, and illustrates a preferred mode of applying the joint to a horizontal pipe-line in a location adjacent to an upward turn of the line.

Fig. 2 is a longitudinal section on an enlarged scale, of the expansion joint in the position shown in Fig. 1.

Fig. 3 is a view similar to a position of Fig. 1, but showing how the mechanism of the joint may be partially disassembled for the purpose of repacking the gland-space at P, Fig. 2, which surrounds the sliding tube B of the joint.

Fig. 4 is a partial end elevation, as seen from the left-hand in Fig. 2, for illustrating certain details hereinafter more fully explained.

Fig. 5 is a sectional view similar to the upper and left-hand portion of Fig. 2, for more fully illustrating certain features of the invention.

Similar characters designate like parts in all the views.

In the embodiment shown, there is provided a pipe line L resting on the roller $r$ which is journaled in the support $f$, the pipe line L being connected with the tubular member B by a head H, the tubular member B telescoping into a receiver E which is connected with the continuation N of the pipe line by a head H'. The continuation N of the pipe line continues into an elbow D which is suitably secured on the support $f'$. Extending from the receiver E over the head H and secured to said receiver E, there is provided a sleeve or cylinder A forming the chamber 6 by which means the surface of the tubular member B is protected so as to prevent the collection or discharge of foreign material thereon. The receiver E is provided with an enlargement at P which has communication with the chamber 6 to receive packing which packing will be clamped in place by the gland ring C disposed on said tubular member B adjacent to said packing.

The framework or casing of my expansion joint may be said to comprise two portions, each preferably internally-cylindrical, located end to end and separably joined together. One of these parts or members is the part designated by E, which constitutes the cylinder, or receiver, for the tube B, which is slidable therein. At one end the casing-member E will usually be provided with means, such as the flange $n$, or other analogous device whereby to connect the part E with the pipe-line member, as N. In practice, the pipe N will usually,—especially when of a relatively large size,—be provided with an ordinary flange $n'$, which may be clamped to the flange $n$ by any suitable means, as for instance, by the bolts $b$, suitably arranged. At the other end, the member E is shown enlarged for providing an annular packing-chamber, or gland-space, at P, into which packing material may be inserted in the usual manner, and for receiving the packing-compressing portion 2 of the gland C. This gland is or may be provided with the usual flange, as 3, (see Figs. 2 and 3), having perforations for bolts, as $b^2$, which extend outwardly through corresponding holes in the member E and are there provided with nuts $d^2$, whereby the gland C may be drawn against the packing at P, without requiring the operator to have access to the gland, or to the heads of said bolts.

For separably uniting the members A and E, these are shown provided with flanges $n^2$ and $n^3$, respectively, and bolts, as $b^3$, of an ordinary kind and of suitable number and arrangement, may be employed for holding the member A by its flange $n^2$ against the flange $n^3$ of the member E. Thus the said members A and E may be united rigidly together, and are readily separated, when required, so that as illustrated in Fig. 3, the cylinder or casing A can be moved temporarily away from the principal member E, and thereby permit the operator to have direct access to the gland C, which may then, if, and as required, be released by removing the packing bolts $b^2$, after which the gland may be slid back (to the left-hand in Fig. 3), for the inspection or renewal of the packing material at P.

In practice, the sleeve or cylinder A should be truly machined on the inner surface 4 thereof so that the annular piston member G will slide freely yet closely within said cylinder while the tubular member B slides through the gland C and the packing at P. The pipe-ring or flange F may be of the same external size as the member G,—as best shown in the sectional view, Fig. 2,—so that the two rings F and G when suitably secured together, may constitute, in effect, one member which is slidable within said cylinder A, after the manner of a guide and piston. Thus, when arranged as in Fig. 2, the two ring-like members F and G, may be said to both coöperate directly with the line-pipe L, while both similarly coöperate with the sliding tube B. The tube B may be integral with, and be the extension of, the line-pipe L, although preferably independent of one another as shown.

In some instances, if it is desired to have the chamber 6 more effectively protected, the head H may have the cupped packing 5 applied thereon in a manner to prevent ingress, and also permit egress of fluid, as indicated in Fig. 5,—when the heads H, H', are approaching, (as during the usual elongation of pipe-line.) This allows for escape of confined fluid, and on the separation of the heads, prevents the consequent suction from drawing in fluid from outside the apparatus. In the present instance as shown in Fig. 5, the cupped packing 5 is secured between the flanges F and G, the flange F being of less diameter than the flange G, so that the outwardly extending portion 7 of the packing 5 may extend over said flange F.

Between the annular surface 8 of the casing member E and the flange 3 of the gland ring C, an annular space is preferably provided to permit of adjusting or tightening the gland ring C against the packing at P according to the wear.

In the present arrangement this annular space is protected, by reason of the chamber 6 being entirely inclosed, from any accumulation of dirt, either gradually or suddenly accumulating,—which would interfere with the closing up of the gland-ring C. Such obstructions, as is well-known, are particularly liable to occur on an uncovered gland-ring, and are, in practice, peculiarly troublesome; also, such obstructions are liable to,—and in practice frequently do,—limit unduly the stroke of the joint as a whole.

The free edge of the sleeve A normally overhanging the head H may be provided with stops formed by the ends 9 of the ribs 10 of the sleeve A or formed as is shown in dotted lines in Fig. 4 by a flange 11 formed along such edge. Due to the stopping means, the pipe line L and the thereto attached tubular member B would not be permitted to be pulled out of engagement with the casing E and sleeve A, since the head H would strike against either the stops 9 or flange 11 and thus limit the movement of such pipe line L. This arrangement is provided so that the tubular member B will always have a sufficient engagement with the casing E so long as the sleeve A is secured in place, the respective length of the sleeve A and tubular member B being predeterminedly. Thus, should at any time the pipe line L be pulled outward to its full limit, and there be no support for the pipe line L except the engagement of the tubular member B with the casing E, this would be sufficient to support the same whereas, if there were no limiting stop, the pipe line L might be pulled out just far enough so that the free end of the tubular member B rested on the gland ring C or extended freely into the chamber 6, and then upon the release of the pipe line L, the weight of the outwardly extending portion of the pipe line L might, acting as a lever, be sufficient to place the tubular member B against the upper side of the sleeve A or the gland ring C, and seriously hamper if not completely destroy the expansion joint.

It is obvious from the foregoing that various changes and modifications may be made to the details of construction without departing from the general spirit of the invention.

I claim:

1. The combination with two sections of a pipe-line, of a casing attached to the end of one pipe section, a tubular member on the end of the other pipe section and slidably disposed in said casing, an annular head on said tubular member, and a member of cylindrical outline extending from said casing over and into intimate engagement with said head to guide and support said tubular member in axial alinement with said casing and to form a protective portion for the sliding surface of said tubular member.

2. A pipe-line expansion joint comprising a chambered casing, a tubular member in alinement with said casing and having one end thereof slidably mounted in a packed joint in one end of said casing, and provided on the outer end thereof with an annular outwardly extending flange, and a flange guiding and supporting member of cylindrical outline extending from said casing over and into intimate engagement with said head to guide and support said tubular member in proper relation to said casing and to form a protective housing for the sliding surface of said tubular member.

3. A device of the character described comprising a casing, a tubular member slidably mounted in said casing, an annular head on said tubular member, a sleeve secured to said casing and extending over such head to form a protective chamber, and a cupped packing secured to said annular head to permit the egress of fluid matter but prevent the ingress thereof.

4. A device of the character described comprising a casing, a tubular member slidably mounted in said casing, an annular head on said tubular member, there being a packing chamber in the end of said casing surrounding said tubular member, packing in said casing, a gland ring disposed on said tubular member and adjacent to said packing, a sleeve secured to said casing and extending over the gland ring and head to form a protective chamber and prevent the accumulation or discharge of foreign material between said gland ring and said casing, and a cupped packing secured to said annular head to permit the egress of fluid matter but prevent the ingress thereof.

5. In combination with two sections of a pipe line, a casing attached to the end of one pipe section, a tubular member slidably disposed in said casing, a flange on said tubular member, a flange on the end of the other pipe section which flange is attached to the flange of said tubular member thereby to secure the tubular member to said other pipe section, said flanges forming an annular head, a sleeve secured to said casing and extending over said head, and a cupped packing secured to said annular head to permit the egress of fluid matter but prevent the ingress thereof.

6. In combination with two sections of a pipe line, a casing attached to the end of one pipe section, a tubular member slidably disposed in said casing, a flange on said tubular member, a flange on the end of the other pipe section which flange is attached to the flange of said tubular member thereby to secure the tubular member to said other pipe section, said flanges forming an annular head, there being a packing chamber in the end of said casing surrounding said tubular member, packing in said chamber, a gland ring disposed on said tubular member and adjacent to said packing, a sleeve secured to said casing and extending over said head, and a cupped packing secured to said annular head to permit the egress of fluid matter but prevent the ingress thereof.

7. In combination with two sections of a pipe line, a casing attached to the end of one pipe section, a tubular member slidably disposed in said casing, a flange on said tubular member, a flange on the end of the other pipe section which flange is attached to the flange of said tubular member thereby to secure the tubular member to said other pipe section, said flanges forming an annular head, there being a tightening chamber in the end of said casing surrounding said tubular member, packing in said chamber, a gland ring disposed on said tubular member adjacent to said packing, a sleeve secured to said casing and extending over said gland ring, means for adjusting the position of said gland ring, said adjusting means being attached to said gland ring and passing through a portion of said casing so as to permit the unhampered manipulation of said adjusting means, and a cupped packing secured to the said annular head to permit the egress of fluid matter but prevent the ingress thereof.

8. An expansion joint having a casing, a tubular member slidably mounted in said casing, an annular head on said tubular member, a sleeve extending from said casing and over such head, and a cupped packing secured to said annular head to permit the egress and prevent the ingress of fluid matter.

RICHARD RUPPEL.

Witnesses:
GUSTAV DREWS,
H. D. PENNEY.